Aug. 13, 1963 S. J. REISER 3,100,496
METERING CONTROL DEVICE FOR SUPPLYING ADDITIVES TO FLUIDS
Filed Nov. 14, 1961 2 Sheets-Sheet 2
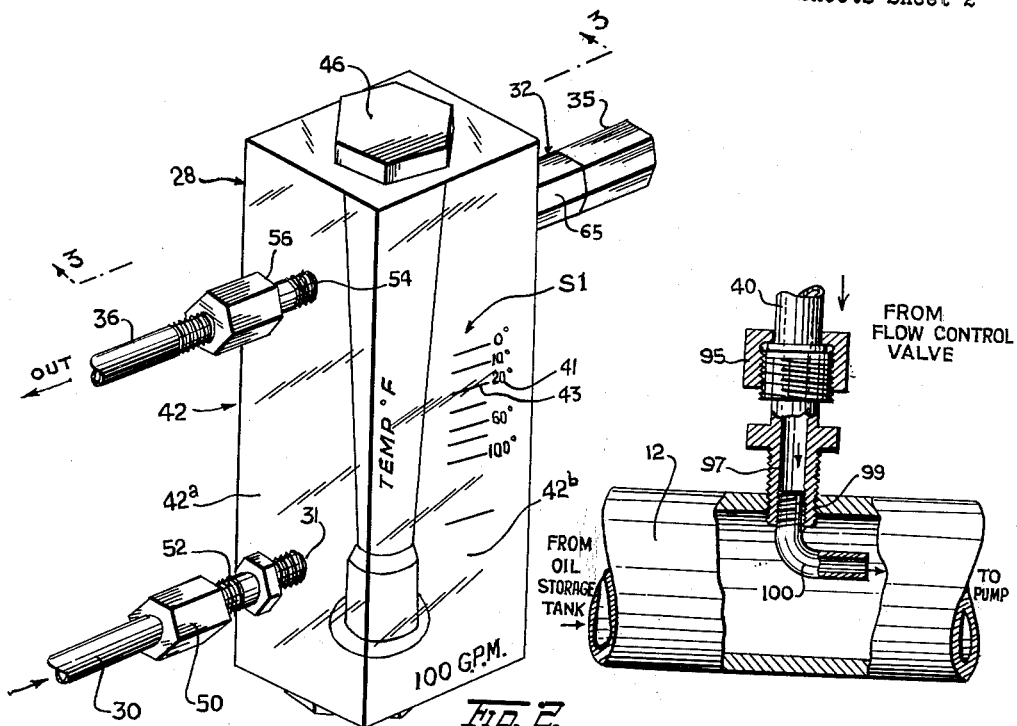
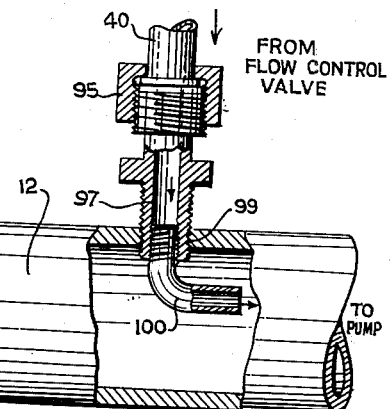
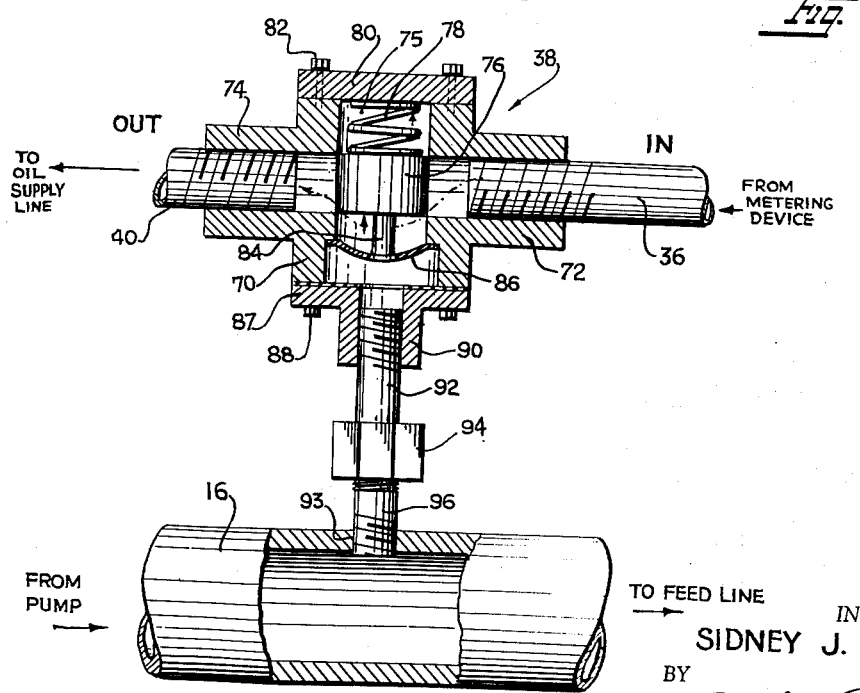
INVENTOR.
SIDNEY J. REISER

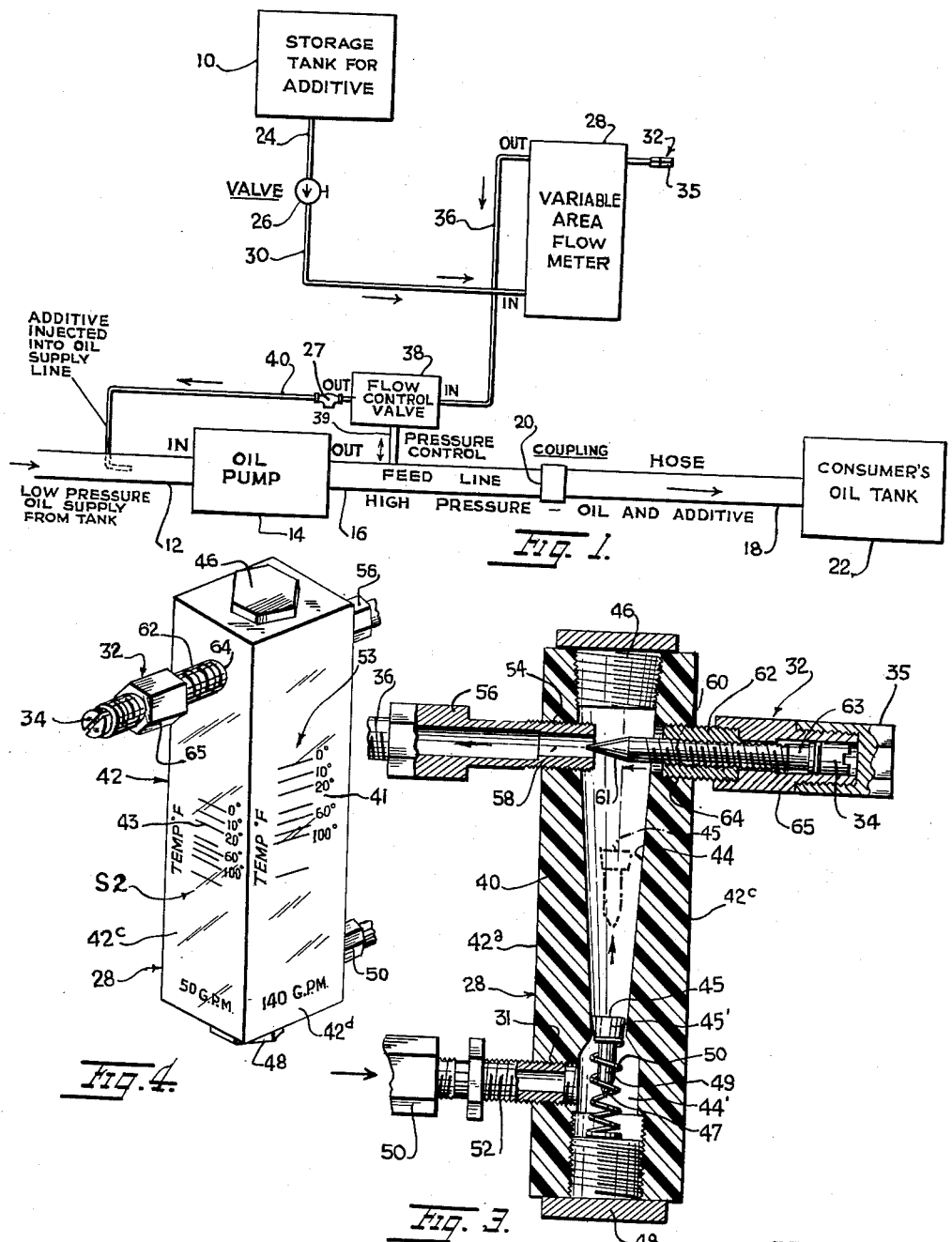

United States Patent Office 3,100,496
Patented Aug. 13, 1963

3,100,496
METERING CONTROL DEVICE FOR SUPPLYING ADDITIVES TO FLUIDS
Sidney J. Reiser, 61—45 98th St., Rego Park, N.Y.
Filed Nov. 14, 1961, Ser. No. 152,282
1 Claim. (Cl. 137—111)

This invention concerns a fluid metering and distribution system.

The invention is particularly concerned with supplying fluid additives to fuel oil in predetermined proportions. For this purpose there is provided a fluid metering and control device connected in a fluid distribution circuit between a tank containing the additive and a fuel oil supply line. A flow control valve is inserted in a line leading from the metering device to the main supply line. A pump is provided in the main supply line for passing the fuel oil and additive to a feed line leading to a consumer's oil tank. The flow control valve is provided with a pressure responsive piston at the output side of the pump for controlling flow of additive through the valve to the main supply line at the input side of the pump.

A principal object of the invention is to provide a fluid distribution system in which a fluid additive is fed into an oil supply line under control of a variable area metering device which is responsive to the rate of flow of the additive.

Another object is to provide a fluid distribution system of the character described in which the additive fluid passes through a pressure responsive control valve into the main oil supply line, the valve being responsive to pressure of oil flowing in the main supply line.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a diagram of the fluid distribution system according to the invention.

FIGS. 2 and 4 are perspective views of a fluid metering and flow control device, parts being removed in FIG. 4.

FIG. 3 is a vertical sectional view taken on line 3—3 of FIG. 2.

FIG. 5 is a sectional view of a fluid control valve and part of an associated oil feed line employed in the system.

FIG. 6 is a fragmentary sectional view of the oil supply line and additive supply line connected thereto.

In FIG. 1 is a diagram of the system according to the invention. The system includes a storage tank 10 in which is a quantity of a suitable additive. The additive may be a mixture of a rust inhibitor, a catalyst to inhibit formation of sulfur trioxide and sulphuric acid in sulfur containing fuel oil, a moisture disperser, an alkalizer to neutralize corrosive sulfur trioxide gas contained in flue gases, and the like.

It is desired to feed the additive fluid to a fuel supply line 12 in certain predetermined proportions of additive and fuel oil. The oil line 12 is connected to an oil supply tank (not shown) such as the tank of an oil delivery truck. A pump 14 has its low pressure intake end connected to the supply line 12 and its high pressure output end connected to feed line 16. A hose 18 is connected to feed line 16 by a coupling 20. The hose in use is inserted in or connected to the consumer's oil tank 22.

A first section 24 of the fluid additive supply line is connected to the outlet of tank 10. A one-way valve 26 permits flow of the fluid additive from tank 10 to the inlet near the bottom of a variable area flow metering device 28 via section 30 of the additive supply line. The metering device has an outlet near its upper end controlled by a needle valve 32. To the outlet of the metering device is connected additive supply line section 36. This line section is connected to the input of a flow-through control valve 38. To the output side of the valve 38 is connected additive supply line section 40. The line section 40 is connected to supply line 12 at the low pressure intake side of pump 14. The valve 38 has a bottom opening at 39 connected to the high pressure feed line 16 at the high pressure side of pump 14 for controlling valve 38 as will be described later.

FIGS. 2–4 show the metering device 28 to best advantage. This device includes a transparent rectangular plastic block 42 with flat sides 42$^a$, 42$^b$, 42$^c$, 42$^d$. In the block is an axially vertical conical bore 44. The narrow end of the bore 44 is at the bottom and the wide end is at the top. A cap screw 46 closes the upper end of the bore 44. Another cap screw 48 closes the bottom end of the bore. On the screw 48 bears a coil spring 50 located in a cylindrical extension 44' of the bore 44. A movable flow constrictor element 45 is supported on the top end of spring 50. This element has a conical head 45' whose maximum diameter is substantially equal to the minimum diameter of the bore 44. The element 45 has a depending pin 49 which serves as a weight and fluid guide. The pin 49 terminates at its bottom end in a conical tip 47.

Section 30 of the additive supply line is connected to the inlet side 42$^a$ of device 28, by a coupling 50 and nipple 52, inserted in opening 31. The line section 30 is in direct communication with the cylindrical bore extension 44'. The block 42 has an outlet opening 54 in side 42$^a$ in which is threaded a nipple 56. Line section 36 is connected to nipple 56. This nipple has a narrow bore 58 extending transversely to the axis of the bore 44 at its upper end. Axially aligned with nipple 56 is valve 32. The valve has a needle valve member 60 having a conical tip 61 adapted to enter the end of bore 58 for controlling fluid flow therethrough. The valve member is threaded in an internally threaded nipple 62 which is externally threaded in a hole 64 in side 42$^c$ of the block. The valve member has an outer cylindrical portion 63 which terminates in a slotted head 34 for receiving a tool for manually adjusting and positioning the valve member 60. The cylindrical portion 63 is guided in a sleeve 65 threaded on nipple 62. A threaded cap 35 on the external threaded portion of sleeve 65 protects the valve against unauthorized use.

In FIG. 5 is shown the flow control valve 38. This valve includes a casing 70 having an input end 72 in which is connected line section 36. The casing has an output end 74 to which is connected line section 40. Inside the casing is a cylindrical chamber 75 located between the input and output ends of the casing. A piston 76 is disposed in the chamber and normally completely shuts off communication between the inlet and outlet ends of the casing. A coil spring 78 bears on top of the piston and is held by a cover plate 80 secured on the casing by bolts 82. A piston shaft 84 is connected to the piston. This shaft depends axially from the piston and is connected to a flexible diaphragm 86 extending across the bottom of chamber 75. A fitting 87 is secured to the bottom of the casing by bolts 88. This fitting has a sleeve 90 in which is threaded a nipple 92 connected by a coupling 94 to another nipple 96. Nipple 96 is threaded in a hole 93 in the side of feed line 16. It will be noted that there is no direct passage for fluid from line 16 to chamber 75 since the diaphragm 86 closes the bottom end of the chamber.

FIG. 6 shows the end of additive supply line section 40 connected by a coupling 95 to a fitting 97 which is threaded in a hole 99 in the side of supply line 12. An elbow nipple 100 is threaded inside fitting 97 and opens axially in the direction of oil flow toward the pump 14.

On the sides 42$^b$, 42$^c$ and 42$^d$ of the block 42 are temperature scales S1, S2, S3 having graduation lines 43 and numerical indications 41. A different temperature scale is provided for each rate of flow of oil with which the flow of additive is to be coordinated. Thus, on side 42$^b$ the temperature scale S1 is calibrated for one hundred gallons per minute of fuel oil flow. On side 42$^c$ the temperature scale S2 is calibrated for fifty gallons per minute and one side 42$^d$ the temperature scale S3 is calibrated for one hundred and forty gallons per minute.

In operation of the system, valve 32 will be set so that a predetermined quantity of additive flows through device 28 at any particular temperature of the additive for any set rate of flow of fuel oil. For example, suppose that fifty gallons of fuel oil per minute are to be supplied to tank 22, at a temperature of 20° F. The valve member 60 of valve 32 will be adjusted by turning its head 34 by a tool until the flow control member 45 rises up in the body of flowing additive to the 20° F. line on scale S2 at side 42$^c$ of the device as shown in FIG. 4. For other temperatures the valve 32 will be adjusted until the top of head 45' is located at others of lines 43 on the temperature scale. For other rates of flow the calibrated temperature scales on sides 42$^b$ or 42$^d$ will be used.

The valve 38 connected between line sections 36 and 40 operates automatically. No additive flows out of tank 10 or device 28 unless oil is flowing at the predetermined rate of flow through feed line 16. Then the pressure of oil in line 16 will raise the diaphragm upwardly so that the piston rises to clear the obstruction in chamber 75 between the inlet and outlet line sections 36 and 40. The additive fluid will then pass through the casing 70 and into the supply line 12. The elbow 100 is directed in the direction of oil flow so that substantially no back pressure is encountered. Valve 26 prevents reverse upward flow of the additive back into the storage tank 10 when the flow is cut off at valve 38 upon a drop in pressure in line 16 below a preset magnitude, and reverse backward flow of the additive back into valve 38 is prevented by a one-way check valve 27 in line 40 adjacent the outlet in valve 38.

The system thus insures that additive will flow into the fuel supply line only when the main oil supply is flowing at a predetermined rate, and the system will feed a predetermined proportioned quantity of additive relative to the quantity of main fuel oil flow. For example, the system may be adjusted to supply one gallon of additive to each 2,000 or more gallons of fuel oil.

Once the system is properly set and adjusted, it requires no further attention since the controls operate automatically. All that is necessary thereafter is to keep the storage tank 10 supplied with fluid additive.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A fluid distribution system, comprising a main oil supply line, a pump having a low pressure inlet and a high pressure outlet, said main oil supply line being connected to the low pressure inlet, an oil feed line connected to the high pressure outlet, a control valve having an inlet at one end, an outlet at the other end, and a passage between the valve inlet and outlet, fluid pressure responsive control means in said valve normally closing the passage between the valve inlet and valve outlet, a fluid additive feed line section connected to the valve inlet, and another fluid additive feed line section connected between the valve outlet and said main oil supply line at said low pressure inlet, said fluid pressure responsive control means being connected to said feed line at the high pressure outlet, said fluid pressure control means including a flexible diaphragm isolating said passage from the feed line, and a piston in said passage connected to the diaphragm and movable thereby against spring bias to open said passage, a storage tank containing said fluid additive, a variable area, fluid flow regulating device having an inlet and an outlet, the first-named additive feed line section being connected between the outlet of said device and the inlet of said valve, and a third additive feed line section connected between said storage tank and the inlet of said device, said device including a rectangular transparent block having a conical bore, said block being disposed with said bore axially vertical with the wider end of the bore uppermost and the narrower end of the bore downward, the inlet of the device being located at the narrow end of the bore and the outlet of the device being located at the wider end of the bore, said block having a calibrated temperature scale on at least one side thereof, and a tapered flow constrictor element movably mounted in the bore to control flow of fluid additive through the bore at a predetermined rate coordinated with locations of graduations of said scale.

References Cited in the file of this patent

UNITED STATES PATENTS

| | | |
|---|---|---|
| 1,753,662 | Merker | Apr. 8, 1930 |
| 2,643,944 | Malir | June 30, 1953 |
| 2,949,130 | Knight | Aug. 16, 1960 |
| 3,024,806 | Colona | Mar. 13, 1962 |